W. J. LYMAN.
Vehicle Hub.
No. 111,070.
Patented Jan. 17, 1871.
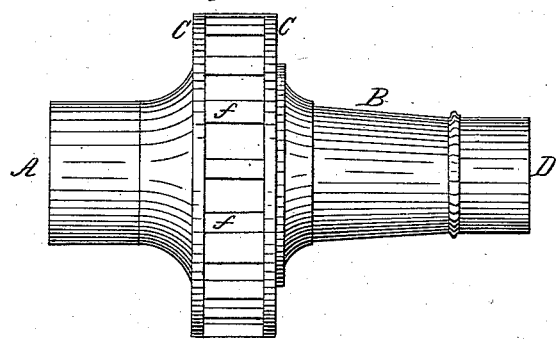
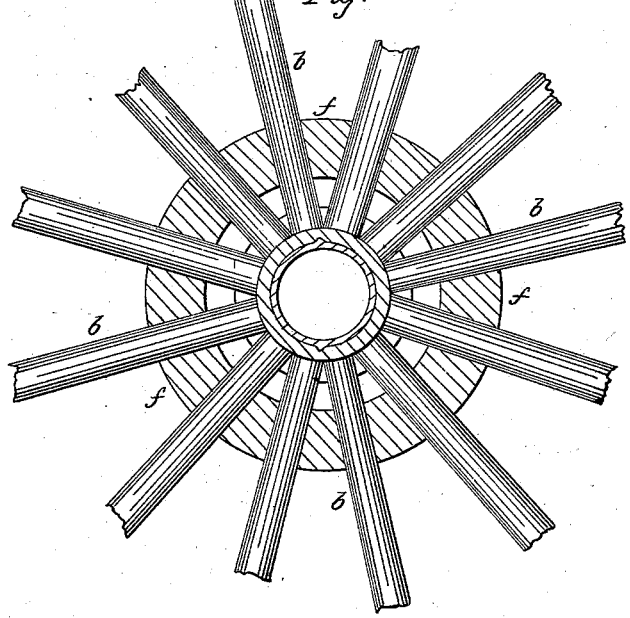

UNITED STATES PATENT OFFICE.

WILLIAM I. LYMAN, OF EAST HAMPTON, MASSACHUSETTS.

IMPROVEMENT IN HUBS FOR VEHICLES.

Specification forming part of Letters Patent No. 111,070, dated January 17, 1871.

*To all whom it may concern:*

Be it known that I, WILLIAM I. LYMAN, of East Hampton, Hampshire county, Commonwealth of Massachusetts, have invented certain Improvements in Hubs for Vehicles, of which the following is a specification.

The nature of my invention consists in forming the entire outside casing or shield of a wheel-hub of metal, and into which the hub is forced to secure the box, and for the purpose of holding the tenons upon the ends of the spokes, and so formed as to leave a space between two collars that rise from the cylindrical sides of hub, said space being between the sides of the collars and between the surface of the hub and inner edges of bars connecting the collars. The connecting-bars extend between the collars at their outer perimeters, and extend inward radially toward the center of the hub a sufficient distance to afford a bearing-surface to the spokes that fit between them, leaving a space between their inner edges and the hub, as before mentioned, for a purpose hereinafter described; and the object of my invention is to form the casing or shield for a hub that shall be entirely of metal, and shall so entirely protect the hub and ends of the spokes from exposure that decay shall be impossible, while at the same time the ends of spokes within the collars, the hub, and the casing shall be in effect practically one piece, and the metal casing shall also extend to form the band.

In the drawings, Figure I is a plan view; Fig. II, a cross-sectional view of my invention.

A B are the cylindrical surfaces of the shell, from which the collars C C rise, the one A extending to the shoulder of the axle, and the one B being prolonged to form the band D. *f f*, &c., are the pieces connecting the collars C C. H is the hub for the reception of the box; and *b b*, &c., are the spokes, let in the hub in a groove, turned, or in mortises.

In making the entire covering of the hub of metal, the important advantages of lightness and beauty are obtained without any sacrifice of strength, as the internal area need be no larger than what will suffice to contain a hub of wood, to hold the box and seat the ends of the spokes, and this hub can be made much smaller and lighter than is required usually in hubs, as the metal covering re-enforces it, and in this way I am able to make a carriage or buggy hub no larger in circumference than a prolongation of the axle would be from the point where the hub comes against the shoulder, and I am able to force the hub into the case, or shrink the case over the hub, so that it is impossible for it to work loose. Transverse projections upon the inner surface of the case fitting into grooves in the hub, or vice versa, entirely prevent it from turning within the case.

From the surfaces A B rise the collars C C, which are connected by the cross-pieces *f f*, &c., which have their outer surfaces flush with the perimeters of the collars, and their inner edges at some distance from the surface of the hub. The perimeters of these collars are sufficiently large to admit of enough space being between the sides of the pieces *f f* to receive the whole spoke, thereby doing away with the necessity of weakening the whole wheel by trimming the ends of the spokes. Were the pieces *f f* extended entirely to the hub, thereby making a metal socket, the tendency of either the contraction of the metal by cold or the expansion of the ends of the spokes from moisture, would be to force the spokes from the hub; but in my hub, the spokes being driven through the spaces between the pieces *f f*, the effect of any atmospheric change, either upon the metal casing or spokes themselves, would be to rivet the latter in their places by pressing the metal inner edges of pieces *f f*, &c., into the wood of the spoke, or else swelling the end of the spoke beyond the connecting-pieces. The hub, being driven into the case, can have mortises cut in it before being forced into place, so that a mortise will come opposite the end of each spoke; or else a simple groove can be cut in the hub before being inserted. The spokes, being driven in without their ends being trimmed, fill up the groove, coming in contact with and bracing each other, as shown in Fig. II. The spokes being driven into place in the case and hub, the space around them between the inner edges of pieces *f f*, &c., and between the spokes and the inner surfaces of the collars, is then filled with melted sulphur or cement, or similar substance in its nature, which, when it cools or dries, forms, with the metal case and spokes, a strong light hub, that cannot become deranged by the ordinary exigencies to which hubs are subjected.

I claim—

1. The combination of the spokes, metal casing, wooden hub, and melted sulphur, cement, or their equivalent, for the purpose of filling in around the spokes.

2. A metallic casing or shield for a hub, constructed substantially as described, and consisting of the parts A B, connected at the collars C C by the pieces $f\,f$, extending toward the center of the hub, and leaving a space between their inner edges and the hub, and having the part B extended to form the band D.

WM. I. LYMAN.

Witnesses:
R. F. HYDE,
L. A. TIFFT.